(12) United States Patent
Uchiyama et al.

(10) Patent No.: US 7,337,951 B2
(45) Date of Patent: Mar. 4, 2008

(54) STORE CASH DEPOSITING AND DISPENSING APPARATUS, STORE CASH DEPOSITING AND DISPENSING SYSTEM, AND STORE CASH DEPOSITING AND DISPENSING MANAGEMENT METHOD

(75) Inventors: Katsuhiko Uchiyama, Kawasaki (JP); Tsutomu Uematsu, Kawasaki (JP); Kazushi Watari, Kawasaki (JP); Takahiko Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1387 days.

(21) Appl. No.: 10/083,468

(22) Filed: Feb. 27, 2002

(65) Prior Publication Data

US 2003/0083969 A1 May 1, 2003

(30) Foreign Application Priority Data

Nov. 1, 2001 (JP) ............................. 2001-336041

(51) Int. Cl.
*G06Q 40/00* (2006.01)
(52) U.S. Cl. .............................. 235/379; 902/8; 902/9; 902/12
(58) Field of Classification Search ................ 235/379; 902/8, 9, 13, 14, 17, 12; 705/43
See application file for complete search history.

(56) References Cited

U.S. PATENT DOCUMENTS

| | | | |
|---|---|---|---|
| 4,585,928 A | 4/1986 | Watanabe | |
| 4,883,183 A | 11/1989 | Kimura et al. | |
| 5,302,811 A | 4/1994 | Fukatsu | |
| 5,718,318 A | 2/1998 | Wachter | |
| 5,918,720 A | 7/1999 | Robinson et al. | |
| 6,006,989 A | 12/1999 | Ademmer et al. | |
| 6,109,522 A * | 8/2000 | Force et al. | ................ 235/379 |

FOREIGN PATENT DOCUMENTS

| | | |
|---|---|---|
| JP | 9-16691 | 1/1997 |
| JP | 09-161124 | 6/1997 |
| JP | 2000-259948 | 9/2000 |
| JP | 2000-315276 | 11/2000 |
| JP | 2001-113248 | 4/2001 |
| JP | 2001-256534 | 9/2001 |

OTHER PUBLICATIONS

Communication dated Oct. 14, 2003, including European Search Report.
Search Report dated Aug. 3, 2006 (2 pgs.).

* cited by examiner

*Primary Examiner*—Daniel Hess
(74) *Attorney, Agent, or Firm*—Staas & Halsey LLP

(57) ABSTRACT

Deposited cash is housed in a recycling housing portion after designating a sector defining whether or not withdrawal will be possible, amount data relating to the deposited amount being managed by counters based on the designated management sector, amount data relating to an amount withdrawn being managed by the counters when cash housed in the recycling housing portion is withdrawn based on a withdrawal instruction, and at least a portion of the cash housed in the recycling housing portion being conveyed to and housed in a cassette housing portion based on a transfer instruction input via a depositing and dispensing control panel.

10 Claims, 3 Drawing Sheets

Figure 2
| Counter name | Contents | Reserve fund deposit | Sales deposit | Reserve fund dispensing | Amount-in-hand management data |
|---|---|---|---|---|---|
| Management Sector 1 | Store Sales (subject to remittance to a financial institution) | | 100,000 | | 100,000 |
| Management Sector 2 | Store Reserve funds (not subject to remittance to a financial institution) | 50,000 | | 10,000 | 40,000 |
Figure 3
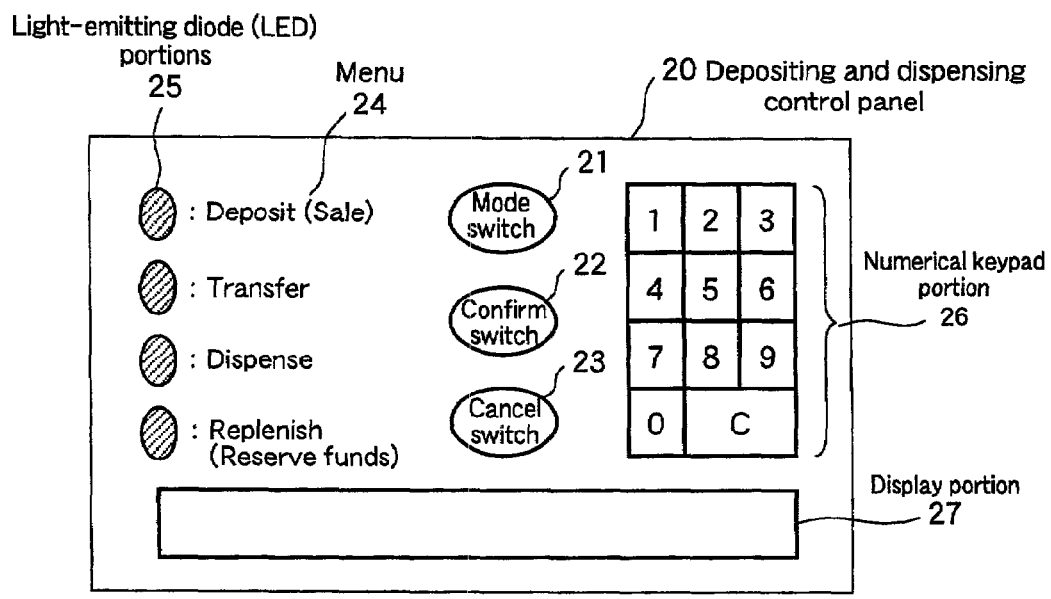
Figure 4
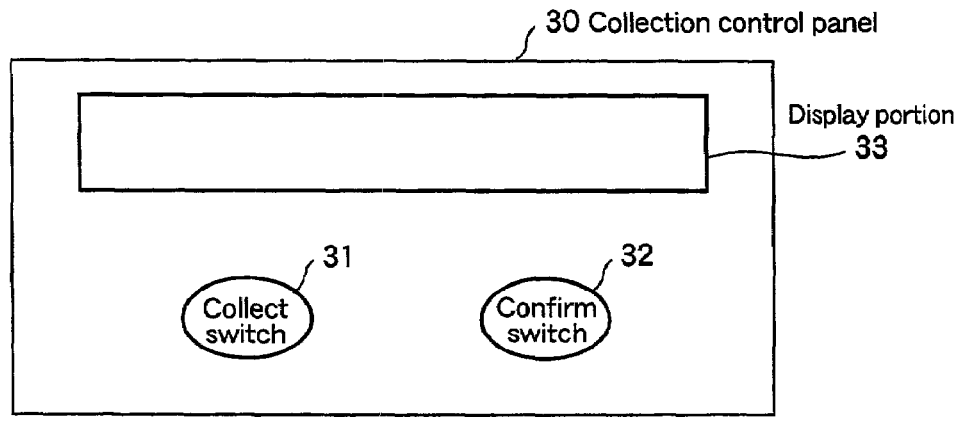

STORE CASH DEPOSITING AND DISPENSING APPARATUS, STORE CASH DEPOSITING AND DISPENSING SYSTEM, AND STORE CASH DEPOSITING AND DISPENSING MANAGEMENT METHOD

BACKGROUND OF THE INVENTION

1. Field of the Invention

The present invention relates to a store cash depositing and dispensing apparatus, a store cash depositing and dispensing system, and a store cash depositing and dispensing management method installed in a store to enable sales in the store to be deposited and reserve funds, etc., for the store to be taken out.

2. Description of the Related Art

Japanese Patent Laid-Open No. HEI 9-16691 is an example of a conventionally-known store cash depositing and dispensing apparatus. The store cash depositing and dispensing apparatus disclosed in this patent laid-open is provided with: a deposit apparatus installed in a store; a cash processing apparatus for identifying and counting cash when cash from a sale at the store is inserted (deposited) into a deposit machine, a center for performing a depositing process being connected to the cash processing apparatus by means of a communication line; a data processing apparatus for storing the counted amount and controlling transmission of deposit data to the center by means of the communication line, the deposit data including the amount deposited and an identifier for the store; and a cash box for housing the inserted cash. The construction is such that when deposit data is received at the center, a process is performed for depositing money into a bank account corresponding to the identifier for the store and enabling the cash from the deposit machine to be collected. According to this kind of apparatus, the deposit data can be obtained by the center performing the cash collection and delivery services as soon as the cash from the sale in the store is inserted into the deposit apparatus disposed in the store, and the cash from the deposit machine can be reliably transferred to the store's bank without being handled at the store.

However, in a conventional technique of this kind, whereas the collection service for the cash deposited in the cash box is the responsibility of the contracted center (a security company, etc.), cash that has been deposited cannot be taken back out at the store, making it necessary to prepare separately cash functioning as reserve funds for the store. Hence, it is inconvenient that cash of this kind cannot be managed freely at the store once deposited. An additional problem has been that since all of the deposited cash is housed in the cash box, the cash box is soon filled when cash in small denominations is deposited frequently, making the handling of deposited cash inconvenient for the center.

Moreover, concerning the former problem that cash that has been deposited cannot be withdrawn at the store, the present applicants have previously proposed (in Japanese Patent Application No. 2000-113248) a store cash depositing and dispensing apparatus provided with two kinds of cash housing location, namely: a withdrawable cash housing location enabling cash which is withdrawable after being deposited to be housed as reserve funds for the store; and a non-withdrawable cash housing location enabling cash which is non-withdrawable after being deposited to be housed for collection by the security company, in order to enable management by a single apparatus of cash for reserve funds, etc., which is withdrawable after being deposited. However, when depositing cash in this apparatus, advance designation must be made when the cash is deposited as to which of either the withdrawable cash housing location or the non-withdrawable cash housing location the cash is to be later housed in, and in that case, if the non-withdrawable cash housing location is designated and the money deposited therein, the cash therein still cannot be withdrawn, and thus inconvenience remains in that the cash therein can no longer be withdrawn even if a case arises in which it is desirable to withdraw such cash after the money has been deposited. Furthermore, even in this kind of apparatus, the cash box soon becomes full, and thus the latter problem described above, in which handling at the center is made inconvenient, is not still solved.

SUMMARY OF THE INVENTION

The present invention is constructed in view of the circumstances stated above and an object of the present invention is to provide a store cash depositing and dispensing apparatus, a store cash depositing and dispensing system, and a store cash depositing and dispensing management method in which deposit management at the store is convenient and a cash collection operation is facilitated for a cash collector by enabling a deposited amount to be withdrawn and making a housing portion (a cash box) housing the cash to be collected by the cash collector less likely to become full.

In order to achieve the above object, according to one aspect of the present invention, there is provided a store cash depositing and dispensing apparatus including: a depositing section for depositing an amount of cash; a sector designation section for designating a sector defining whether or not it will be possible to perform withdrawal of the amount deposited by the depositing section after depositing; a first management section for managing amount data relating to the amount deposited by the depositing section based on the sector designated by the sector designation section; a first housing portion for housing the cash deposited by the depositing section so as to be withdrawable by a depositing operator; a withdrawal section for withdrawing an amount of the cash housed in the first housing portion based on a predetermined withdrawal instruction; a second management section for managing amount data relating to the amount withdrawn by the withdrawal section; a second housing portion for housing cash so as not to be withdrawable by the depositing operator; and a conveyance section for conveying at least a portion of the cash housed in the first housing portion to the second housing portion based on a predetermined conveyance instruction.

According to this kind of construction, since the deposited cash is first housed in the withdrawable first housing portion regardless of whether or not withdrawal is to be possible after depositing, it can be withdrawn later as reserve funds. In this case, since the amount data based on the sector are managed by the first management section and the amount data relating to the amount withdrawn are managed by the second management section, management of depositing in the store and withdrawal of the deposited cash is performed by a single apparatus, and consequently, the management of sales and reserve funds, for example, is facilitated. Furthermore, since the second housing portion housing the cash so as not to be withdrawable after being deposited houses the cash conveyed from the first housing portion by the conveyance section based on the conveyance instruction, problems from the related art, such as the second housing portion (the cash box) soon becoming full, can be solved by conveying the instructed amount such that the amount is constituted by denominations having a large face value, for example.

Moreover, in the preferred embodiment of the present invention, the depositing section is constituted by a depositing aperture, a depositing and dispensing operation portion, a differentiating portion, and a control portion, the sector designation section is constituted by the depositing and dispensing operation portion and the control portion, the first management section is constituted by the control portion and counters, the first housing portion is constituted by a recycling housing portion, the withdrawal section is constituted by a dispensing aperture, the depositing and dispensing operation portion, the differentiating portion, and the control portion, the second management section is constituted by the control portion and the counters, the second housing portion is constituted by a cassette housing portion, and the conveyance section is constituted by the control portion, the differentiating portion, and conveyance passages. The predetermined conveyance instruction is performed from a depositing and dispensing control panel which is presented by the depositing and dispensing operation portion.

The store cash depositing and dispensing apparatus of the present invention may further include a housed amount management section for managing amount data relating to an amount housed in the first housing portion and an amount housed in the second housing portion based on management data in the first management section and the second management section and amount data relating to an amount conveyed by the conveyance section.

According to this kind of construction, the cash housed in the first housing portion and the cash housed in the second housing portion can be ascertained easily, making it very easy to manage and handle the cash. Moreover, in the preferred embodiment of the present invention, the housed amount management section is constituted by the control portion and the counters.

In the store cash depositing and dispensing apparatus of the present invention, the conveyance section may include a selection section for selecting constituent denominations in such a way that the cash conveyed to and housed in the second housing portion based on the predetermined conveyance instruction is composed of a minimal number of constituent bills or notes.

According to this kind of construction, the problem where the second housing portion soon becomes full spatially can be solved, facilitating handling by a cash collector Moreover, in the preferred embodiment of the present invention, the selection section is constituted by the control portion and the differentiating portion.

Moreover, in the store cash depositing and dispensing apparatus of the present invention, the predetermined conveyance instruction may include an instruction relating to an amount to be conveyed by the conveyance section, the amount to be conveyed according to the predetermined conveyance instruction being set based on amount data based on the sector designated as being not withdrawable managed by the first management section or set based on amount data determined by an input operation.

According to this kind of construction, if the amount to be conveyed is based on the amount data based on the sector designated as being not withdrawable managed by the first management section, an amount based on an original schedule is collected by the center, whereas if the amount to be conveyed is based on the amount data determined by the input operation, it is possible to have an amount differing from the original schedule collected by the center, enabling the handling of the cash in the store to be made flexible, thereby making the construction superior in serviceability.

In the store cash depositing and dispensing apparatus of the present invention, the withdrawal section may be able to withdraw cash exceeding amount data based on the sector designated as being withdrawable managed by the first management section in an amount range of cash housed in the first housing portion.

According to this kind of construction, it is also possible to perform withdrawal of cash exceeding an originally scheduled amount, also enabling the handling of the cash in the store to be made flexible, thereby making the construction superior in serviceability.

The store cash depositing and dispensing apparatus of the present invention may further include a transmitter-receiver section for transmitting and receiving administrative information managed by the first management section or the second management section to and from an external apparatus.

According to this kind of construction, administrative information can be accessed from a remote location, enabling convenience to be increased.

The store cash depositing and dispensing apparatus of the present invention may further include a cash collection authority management section for differentiating between and managing authority to collect the cash housed in the first housing portion and authority to collect the cash housed in the second housing portion.

According to this kind of construction, security levels for the first housing portion in which the cash is housed so as to be withdrawable and for the second housing portion in which the cash is housed so as not to be withdrawable can be differentiated, enabling security measures corresponding to each of the housing portions to be disposed. Moreover, in the preferred embodiment of the present invention, the cash collection authority management section is constituted by the control portion, authority being checked by section of an administrative number for the operator input via the depositing and dispensing control panel or the collection control panel, and if the administrative number has authority, the depositing and dispensing processes or the collection process can be continued.

The store cash depositing and dispensing apparatus of the present invention may further include an external control apparatus enabling control from outside.

According to this kind of construction, it is possible, for example, to provide depositing instructions and dispensing instructions by means of operation from the external portion, thereby making the construction superior in serviceability.

According to another aspect of the present invention, there is provided a store money depositing and dispensing system including:
  a center computer being a computer at a center for performing cash collection and delivery services; and
  a store cash depositing and dispensing apparatus being disposed in a store and being connected to the center computer by means of a communication line, the store cash depositing and dispensing apparatus including: a depositing section for depositing an amount of cash; a sector designation section for designating a sector defining whether or not it will be possible to perform withdrawal of the amount deposited by the depositing section after depositing; a first management section for managing amount data relating to the amount deposited by the depositing section based on the sector designated by the sector designation section; a first housing portion for housing the cash deposited by the depositing section so as to be withdrawable by a depositing operator; a withdrawal section for withdrawing an amount of the cash housed in the first housing portion based on a predetermined withdrawal instruction; a second management section for managing amount data relating to the amount withdrawn by the withdrawal section; a second housing portion for housing cash so as not to be withdrawable by the depositing operator; and a conveyance section for conveying at least a portion of the cash housed in the first housing portion to the second housing portion based on a predetermined conveyance instruction.

According to this kind of construction, cash depositing and dispensing management is facilitated at both the center and the store. Furthermore, cash depositing and dispensing information for a plurality of stores can be managed intensively at the center.

According to yet another aspect of the present invention, there is provided a store cash depositing and dispensing management method in which cash is managed by a store cash depositing and dispensing apparatus disposed in a store, the store cash depositing and dispensing management method including:

housing an amount of cash after designating a sector defining whether or not it will be possible to perform withdrawal after depositing the cash and depositing the cash in a first housing portion in which the cash is withdrawable by a depositing operator; managing amount data relating to the deposited amount based on the designated sector; managing amount data relating to an amount of cash withdrawn when withdrawing cash housed in the first housing portion based on a withdrawal instruction; and conveying at least a portion of the cash housed in the first housing portion to a second housing portion in which the cash is not withdrawable by the depositing operator and housing the cash in the second housing portion based on a predetermined conveyance instruction.

According to this kind of construction, the deposited amount can be withdrawn and the housing portion (cash box) for housing the cash to be collected by the cash collector is less likely to become full, and consequently deposit management at the store is convenient and the cash collection operation is facilitated for the cash collector.

BRIEF DESCRIPTION OF THE DRAWINGS

FIG. 2 is a sample from a sales counter (Management Sector 1 counter) and a reserve funds counter (Management Sector 2 counter);

FIG. 3 is an example of a depositing and dispensing control panel;

FIG. 4 is an example of a collection control panel; and

DETAILED DESCRIPTION OF THE PREFERRED EMBODIMENT

The preferred embodiment of the present invention will now be explained using the drawings.

Moreover, in the present embodiment, a store cash depositing and dispensing apparatus capable of distinguishing between managing store sales (hereinafter "sales"), which are subject to remittance to a financial institution and are not normally withdrawn, and store reserve funds (hereinafter "reserve funds"), which are not subject to remittance to a financial institution and may be withdrawn for change, etc., will be given as an example. Specifically, management sectors for distinguishing between the sales and the reserve funds are provided and counters are provided for each of these management sectors, management of each of the sectors being enabled by designating a management sector when performing a depositing operation. In the present embodiment, Management Sector 1 manages the sales, and Management Sector 2 manages the reserve funds. Moreover, in the present embodiment, the operation required when an operator at the store takes out cash that has been deposited will be called "dispensing".

In addition, in the present embodiment, a housing portion enabling dispensing and a housing portion not enabling dispensing are provided, the deposited sales and reserve funds being temporarily housed in the housing portion enabling dispensing used for the dispensing process and cash not dispensed being conveyed from the housing portion enabling dispensing to the housing portion not enabling dispensing by a predetermined operation. The cash housed in the housing portion not enabling dispensing is collected at a predetermined time by a security company.

Figure 1:
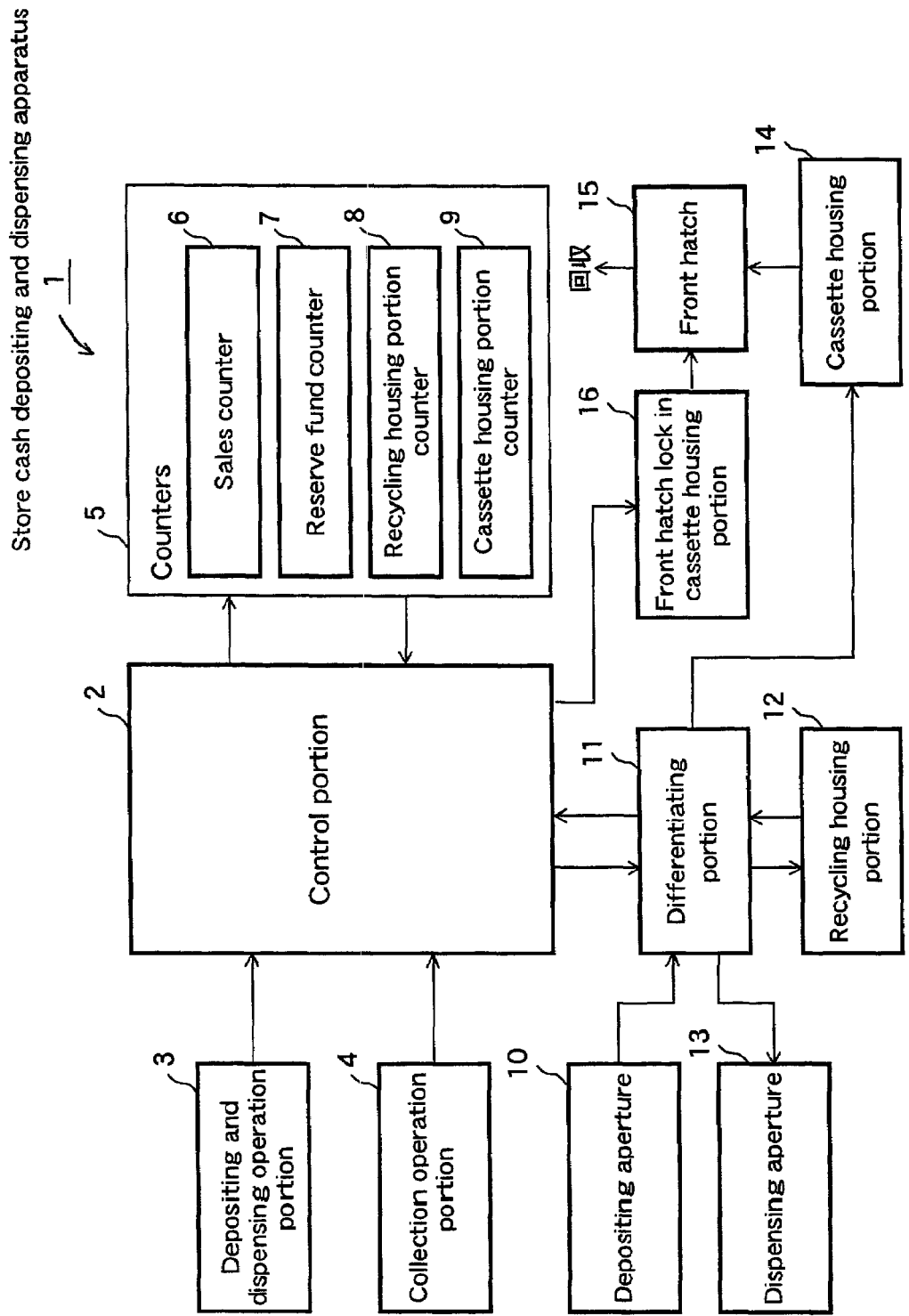
FIG. 1 is a block diagram showing a store cash depositing and dispensing apparatus in the present embodiment.

FIG. 1 is a block diagram showing a store cash depositing and dispensing apparatus in the present embodiment. In the figure, a store cash depositing and dispensing apparatus 1 is provided with: a control portion 2 for performing control of depositing and dispensing of the cash, a housing process, and the security control; a depositing and dispensing operation portion 3 for performing depositing and dispensing operations; a collection operation portion 4 for performing the collection of cash housed inside the store cash depositing and dispensing apparatus 1; counters 5 for managing the depositing and dispensing status and the housing status in the store cash depositing and dispensing apparatus 1; a depositing aperture 10 for depositing cash; and a differentiating portion 11 for differentiating between cash to be deposited and dispensed and cash to be conveyed inside the store cash depositing and dispensing apparatus 1. In addition, the store cash depositing and dispensing apparatus 1 is constituted by: a recycling housing portion 12 for housing the deposited cash so as to be able to be dispensed; a dispensing aperture 13 for dispensing the cash housed in the recycling housing portion 12; a cassette housing portion 14 for housing the deposited cash so as not to be able to be dispensed; a front hatch 15 disposed in the cassette housing portion 14, the front hatch 15 being opened and closed when the cash housed in the cassette housing portion 14 is collected; and a front hatch lock 16 in the cassette housing portion for controlling locking of the front hatch 15.

Moreover, the counters 5 are constituted by four counters including: a sales counter (Management Sector 1 counter) 6 for counting the deposited sales; a reserve fund counter (Management Sector 2 counter) 7 for counting the deposited reserve funds; a recycling housing portion counter 8 for counting the cash housed in the recycling housing portion 12; and a cassette housing portion counter 9 for counting the cash housed in the cassette housing portion 14, the amount of money in the sales and the reserve funds and the amount of cash housed in the recycling housing portion and the cassette housing portion being managed. Moreover, FIG. 2 shows a sample from the sales counter (the Management Sector 1 counter) 6 and the reserve fund counter (the Management Sector 2 counter) 7. The recycling housing portion counter 8 and the cassette housing portion counter 9 are not shown, but amount-in-hand management data are constantly stored therein.

First, operation during depositing and processing inside the store money depositing and dispensing apparatus 1 will be described in detail. A case in which 15,000 yen from a sale is deposited is explained as an example. The deposit is performed through the depositing aperture 10 by means of a depositing operation in the depositing and dispensing operation portion 3. FIG. 3 is an example of a depositing and dispensing control panel presented by the depositing and dispensing operation portion 3. The depositing and dispensing control panel 20 in the figure is provided with three switches including: a Mode switch 21 for choosing a process mode; a Confirm switch 22 for confirming the process; and a Cancel switch 23 for canceling an input operation, and is additionally provided with: a menu 24 (of modes) for the money depositing and dispensing operation selectable by means of the Mode switch 21; light-emitting diode (LED) portions 25 which light up to show which mode in the menu 24 has been selected; a numerical keypad portion 26 for inputting the amount of money being deposited or dispensed and administrative numbers such as an identifier for the operator, etc.; and a display portion 27 for displaying operating guidance, the amount of money input by the operator, etc.

The operator selects the mode by depressing the Mode switch 21 of the depositing and dispensing control panel 20 shown. Here, the LED portions 25 to the left of each mode in the menu 24 light up sequentially each time the Mode switch 21 is depressed, the mode shown to the right of the lit LED portion 25 being the currently-selected mode. Consequently, the operator continues depressing the Mode switch 21 until the LED portion 25 of the desired mode in the menu 24 lights up.

When a sale is to be deposited, the LED portion 25 corresponding to "Deposit (Sale)" is lit up and the Confirm switch 22 is depressed. Then, the control portion 2 organizes for the depositing process according to Management Sector 1 to be performed. Next, guidance is displayed on the display portion 27 asking for the operator to input his or her administrative number. The administrative number is an identifier given to each operator beforehand to maintain security. The operator inputs his or her administrative number by means of the numerical keypad portion 26. Moreover, a system such as identification cards, etc., may be used to input the administrative number.

The control portion 2 determines by means of the input administrative number whether the operator is qualified to perform the depositing operation. If it is determined that the operator is not qualified, the depositing process is terminated. If it is determined that the operator is qualified, next, the deposit mode is displayed on the display portion 27. For example, "(1) Deposit Designated Amount (Designate the amount to be deposited)" and "(2) Deposit All (Deposit the full amount inserted into the depositing aperture)" are displayed and either of these is selected by means of the Mode switch 21, the mode being confirmed by depressing the Confirm switch 22. If, for example, the amount of money to be deposited is 15,000 yen, the amount inserted is 20,000 yen, and 5,000 yen in change is to be dispensed, (1) should be selected. In the case of (1), the operator inputs the amount to be deposited by means of the numerical keypad portion 26, confirms the amount by means of the Confirm switch 22, then inserts the cash into the depositing aperture 10.

The deposited cash is housed in the recycling housing portion 12 after authentication and separation into denominations by means of the differentiating portion 11. Denomination separation data generated by the differentiating portion 11 is transmitted to the control portion, and if, for example, the amount to be deposited is 15,000 yen and the amount actually inserted is 20,000 yen, the control portion 2 dispenses 5,000 yen in cash from the cash already housed in the recycling housing portion 12 as change through the dispensing aperture 13 by means of the differentiating portion 11. Hence, in the case of (1), depositing and dispensing are processed together. After completion of the depositing process, the sales counter 6 and the recycling housing portion counter 8 are each incremented by 15,000 yen by means of the control portion 2.

Hence, the deposited sale remains housed in the recycling housing portion 12 until a transfer process is performed. This means that the sales and the reserve funds are housed together in the recycling housing portion 12, but since amount data are managed by means of the sales counter 6 and the reserve fund counter 7 described above, no inconvenience arises.

Moreover, reserve funds can also be deposited by a similar depositing process by selecting "Replenish (Reserve funds)" mode in a similar manner to that described above.

Next, the transfer process will be described in detail. The transfer process is a process for housing cash which will not be dispensed, in other words sales, in the cassette housing portion 14, the amount among the sales housed in the recycling housing portion 12 which is to be collected being designated and housed in the cassette housing portion 14. In the present embodiment, the operator can send the transfer instruction at any time using the depositing and dispensing control panel 20.

The specific operation and processing by the store cash depositing and dispensing apparatus 1 are as follows: First, the "Transfer" mode is selected by depressing the Mode switch 21 on the depositing and dispensing control panel 20 shown in FIG. 3. Next, in a similar manner to that described above, the transfer mode is displayed by the display portion 27 after the administrative number of the operator is input. The following are some examples of transfer modes:

(1) Transfer Set Amount:
  a set amount (or denomination, or number of bills or notes) is conveyed from the recycling housing portion to the cassette housing portion;
(2) Transfer Full Amount:
  the full amount of the sales housed in the recycling housing portion is conveyed from the recycling housing portion to the cassette housing portion;
(3) Transfer All Bills/Notes:
  all of the paper money in the recycling housing portion is conveyed to the cassette housing portion; and
(4) Transfer All Coins:
  all of the coins in the recycling housing portion are conveyed to the cassette housing portion.

The Mode switch 21 pushed continuously until the desired transfer mode is displayed, then the Confirm switch 22 is pushed. Next, the administrative number of the operator is input. The control portion 2 determines by means of the input administrative number whether the operator is qualified to order the transfer process. If it is determined that the operator is not qualified, the transfer process is terminated. If it is determined that the operator is qualified, the control portion 2 performs a process corresponding to the confirmed mode. For example, in the case of (1), the operator inputs the amount to be transferred by means of the numerical keypad portion 26 and confirms the amount using the Confirm switch 22, then the input amount is counted out by means of the differentiating portion 11 and conveyed to and housed in the cassette housing portion 14 by the control portion 2. In the case of (2), the full amount of the sales in the recycling housing portion 12 is automatically conveyed to and housed in the cassette housing portion 14. At this time, the control portion 2 instructs the differentiating portion 11 to select the constituent denominations in such a way that the cash which is conveyed and housed is constituted by a minimal number of constituent bills or notes. Hence, the volume of the cash housed in the cassette housing portion 14 can be reduced. Furthermore, the probability that plenty of small change, etc., will remain in the recycling housing portion 12 is raised compared to the related art, which is convenient when dispensing change, etc.

After the transfer process, in the case of (1), the sales counter 6 and the recycling housing portion counter 8 are decremented by the control portion 2 by the amount transferred and the cassette housing portion counter 9 is incremented by the amount transferred.

Moreover, in the present embodiment, the amount to be transferred can still be processed even if it exceeds the amount of sales. For example, if the sales housed in the recycling housing portion 12 amount to 500,000 yen and the amount to be transferred is 550,000 yen, the control portion 2 adds 50,000 yen from the reserve funds to the 500,000 yen from the sales housed in the recycling housing portion 12 and conveys the combined amount to the cassette housing portion 14. In that case, the sales counter 6 is decremented by 500,000 yen by the control portion 2 and the reserve fund counter 7 is decremented by 50,000 yen. The recycling housing portion counter 8 is also decremented by the amount transferred and the cassette housing portion counter 9 is incremented by the amount transferred.

Next, operation and processing by the store money depositing and dispensing apparatus 1 will be explained in detail for cases where the reserve funds housed in the recycling housing portion 12 are dispensed, which is separate from the change dispensing process, that is, the dispensing process performed together with the depositing process. First, "Dispense" is selected by means of the Mode switch 21 and the Confirm switch 22 is pushed. Next, the administrative number of the operator is input.

The control portion 2 determines by means of the input administrative number whether the operator is qualified to perform the dispensing operation. If it is determined that the operator is qualified, the dispense mode is displayed by the display portion 27, and the desired mode can be brought up on the display portion 27 by means of the Mode switch 21 and the Confirm switch 22 pushed.

Moreover, examples of the dispense mode include:
(1) Dispense Designated Amount:
  dispenses the amount designated; and
(2) Dispense All:
  dispenses the full amount of the reserve funds in the recycling housing portion.

In the case of (1), the operator inputs the amount to be dispensed by means of the numerical keypad portion 26 and confirms the amount by means of the Confirm switch 22. The control portion 2 counts the cash by means of the differentiating portion 11 based on the input amount data and dispenses the counted cash through the dispensing aperture 13. In the case of (2), the full amount of the reserve funds is counted by the differentiating portion 11 and dispensed through the dispensing aperture 13. After dispensing, the amount dispensed is subtracted from the reserve fund counter 7 and the recycling housing portion counter 8.

Moreover, in the above description, the reserve funds are dispensed, but the sales can also be dispensed. In that case, the counter on which subtraction is performed during dispensing should be set to the sales counter.

Furthermore, in the present embodiment, conveyance passages (not shown) are disposed between the differentiating portion 11 and each of the depositing aperture 10, the dispensing aperture 13, the recycling housing portion 12, and the cassette housing portion 14, respectively, and these conveyance passages are used when the cash is conveyed in the depositing and dispensing processes and the transfer process described above.

Next, the process for collecting the cash from the cassette housing portion 14 will be explained in detail. FIG. 4 is an example of a collection control panel which is presented by the collection operation portion 4. The collection control panel 30 in the figure is provided with: a Collect switch 31 for providing a collection instruction; a Confirm switch 32 for confirming the process; and a display portion 33 for displaying operating guidance, etc. Here, an identification card system is used to check whether the operator has authority to perform collection.

First, the operator pushes the Collect switch 31 on the collection control panel 30. Next, a card showing authority to collect the cash from the cassette housing portion 14 is read into an identification card reader (not shown) and the Confirm switch 32 is pushed. After checking for authority, if no problems are encountered, the control portion 2 releases the lock 16 on the front hatch of the cassette housing portion 14 and indicates on the display portion 33 that collection is possible. Furthermore, if an unauthorized identification card is used, the collection process is terminated immediately.

The operator opens the front hatch 15, pulls the cassette housing portion 14 out, and extracts the cash housed therein. After collection, the cassette housing portion 14 is returned, and the front hatch 15 is closed. The control portion 2 confirms that no cash remains inside the cassette housing portion 14 using sensors (not shown), then engages the lock 16 on the front hatch.

Moreover, collection of the cash in the recycling housing portion 12 is performed by means of the dispensing process described above. Security is improved significantly if separate authority is issued for collecting the cash from the cassette housing portion 14 and for dispensing the cash from the recycling housing portion 12, respectively.

Figure 5:
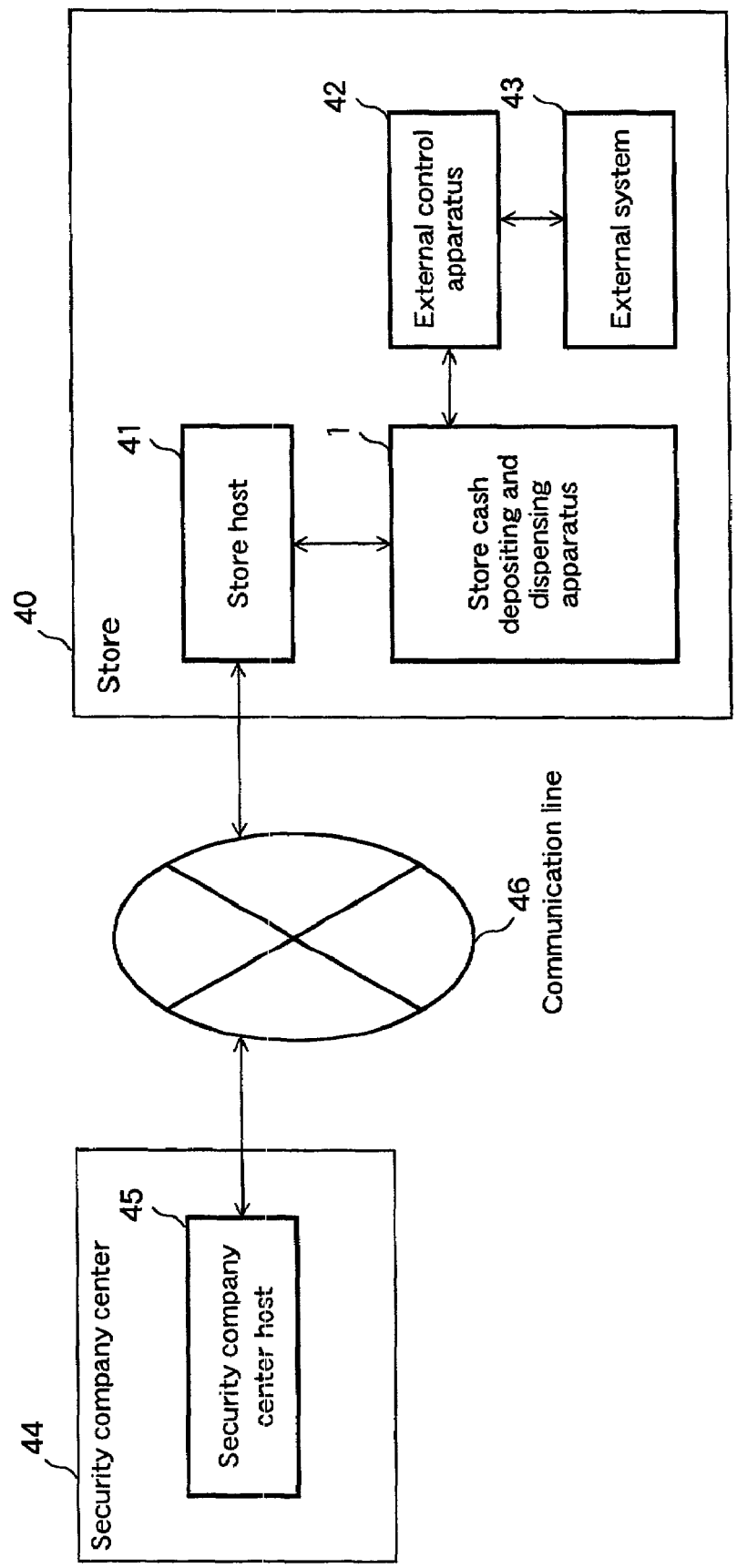
FIG. 5 is an example of a store cash receiving and dispensing system in the embodiment of the present invention.

The store cash depositing and dispensing apparatus 1 described above is normally connected to a security company center host through a communication line, and is managed by transmitting a variety of management data to the center host. However, management of the depositing and dispensing data may also be performed inside the store by connecting a store host for managing the depositing and dispensing data inside the store and the store cash depositing and dispensing apparatus 1 by a communication means. In such cases, it is also possible to give the center host at the security company the function of transmitting data concerning remittances from the store host to the financial institution. In addition, if a communication means is provided for connecting an external control apparatus to the store cash depositing and dispensing apparatus 1, data linking with an external system becomes possible. FIG. 5 is a block diagram showing a store money depositing and dispensing system of this kind.

In the figure, a store host 41 for managing the depositing and dispensing data, etc., of the store cash depositing and dispensing apparatus 1 is provided in the store 40, being connected to the store cash depositing and dispensing apparatus 1 by a local area network (LAN), etc. An external control apparatus 42 for controlling the store cash depositing and dispensing apparatus 1 externally, and an external system 43 connected to the store cash depositing and dispensing apparatus 1 using a communications function of the external control apparatus 42 are also provided. A variety of management data is transmitted to the security company center host 45 of the security company center 44 from the store host 41 by means of a communication line 46, management data relating to cash depositing and dispensing also being managed at the security company.

A process in which the external control apparatus 42 performs cash depositing and dispensing control instead of operation by means of the depositing and dispensing control panel 20 described above will now be described in detail. When performing a deposit, first, a deposit command message is transmitted from the external control apparatus 42 to the store cash depositing and dispensing apparatus 1. The deposit command message is, for example, constituted by operator administrative number data, deposit amount data, a management sector code, etc. When the store money depositing and dispensing apparatus 1 receives the deposit command message, the depositing process is performed in a similar manner to that described above based on the deposit command message. After completion of the depositing process, the store cash depositing and dispensing apparatus 1 transmits a process result message to the external control apparatus 42. The process result message is, for example, constituted by actual deposited amount data, dispensed amount (amount dispensed as change, etc.) data, process time and date data, apparatus status codes, etc. It is possible perform the processes remotely using the communications function to manage the depositing and dispensing processes in this manner, .

It is also possible to set and control the store cash depositing and dispensing apparatus 1 from the external control apparatus 42. For example, the convenience of the store cash depositing and dispensing apparatus 1 can be increased by improving the user interface of the depositing and dispensing control panel 20 or the collection control panel 30 described above, or adding a variety of modes, or even changing or adding management sectors, etc., and performing the various settings for the store cash depositing and dispensing apparatus 1 externally.

It is also possible to control the operation of the store cash depositing and dispensing apparatus 1 from the external system 43 by providing the external control apparatus 42 with a means for communicating with the external system 43, and additionally providing the external control apparatus 42 with a function for generating operating instruction command messages for the store cash depositing and dispensing apparatus 1 based on data imported from the external system 43.

As a working example thereof, a bill collector, for example, makes rounds of clients' premises and collects cash, inputs the collection data into a handheld terminal (the external system 43), and brings back the cash actually collected. The bill collector connects the handheld terminal (the external system 43) to the external control apparatus 42 to enable the external control apparatus 42 to read the collection data. The external control apparatus 42 generates a deposit command message for the store cash depositing and dispensing apparatus 1 based on the collection data and transmits the message to the store cash depositing and dispensing apparatus 1. The deposit command message has a composition similar to the message described above. The bill collector actually deposits the collected cash in the store cash depositing and dispensing apparatus 1 at a predetermined time. The control portion 2 of the store cash depositing and dispensing apparatus 1 collates the deposit amount data inside the deposit command message transmitted from the external control apparatus 42 with the deposited cash amount and transmits the result to the external control apparatus 42. Hence, management of the deposit data is expedited.

A preferred embodiment of the present invention has been explained above, but it goes without saying that the present invention is not limited to the embodiment described above and can be applied to a variety of store cash depositing and dispensing apparatuses and store cash depositing and dispensing management systems.

As explained above, according to the present invention, since deposited cash is first housed such that dispensing is possible regardless of whether or not dispensing is to be possible, a portion of the cash which has been deposited can be dispensed when required and easily utilized for other purposes. Since cash depositing and dispensing are performed according to cash depositing and dispensing management sectors in the store cash depositing and dispensing apparatus and administrative information relating to the cash which is deposited or dispensed is managed by the store cash depositing and dispensing apparatus, management outside the store cash depositing and dispensing apparatus is no longer necessary. In addition, since cash which is housed such that dispensing is possible is conveyed to and housed in a housing portion where dispensing is not possible (the cassette housing portion in the preferred embodiment) by means of a predetermined conveyance instruction, it is possible to choose constituent denominations such that the amount housed therein is composed of a minimal number of constituent bills or notes, enabling the volume of cash housed in the cassette housing portion to be less than in the past. Hence, the interval between visits by cash collectors from a security company, etc., to collect the cassette housing portion can be lengthened, exhibiting the effect of suppressing costs required for collection.

What is claimed is:

1. A store cash depositing and dispensing apparatus comprising:
    a depositing section for depositing an amount of cash;
    a sector designation section for designating a sector defining whether or not it will be possible to perform withdrawal of said amount deposited by said depositing section after depositing;
    a first management section for managing amount data relating to said amount deposited by said depositing section based on said sector designated by said sector designation section;
    a first housing portion for housing all of said cash deposited by said depositing section so as to be withdrawable by a depositing operator;
    a withdrawal section for withdrawing an amount of said cash housed in said first housing portion based on a predetermined withdrawal instruction;
    a second management section for managing amount data relating to said amount withdrawn by said withdrawal section;
    a second housing portion for housing cash so as not to be withdrawable by said depositing operator; and a conveyance section for conveying at least a portion of said cash housed in said first housing portion to said second housing portion only upon receipt of a predetermined conveyance instruction.

2. The store cash depositing and dispensing apparatus according to claim 1 further comprising:
a housed amount management section for managing amount data relating to an amount housed in said first housing portion and an amount housed in said second housing portion based on management data in said first management section and said second management section and amount data relating to an amount conveyed by said conveyance section.

3. The store cash depositing and dispensing apparatus according to claim 1 wherein:
said withdrawal section is able to withdraw cash exceeding amount data based on said sector designated as being withdrawable managed by said first management section in an amount range of cash housed in said first housing portion.

4. The store cash depositing and dispensing apparatus according to claim 1 further comprising:
a transmitter-receiver section for transmitting and receiving administrative information managed by said first management section or said second management section to and from an external apparatus.

5. The store cash depositing and dispensing apparatus according to claim 1 further comprising:
a cash collection authority management section for differentiating between and managing authority to collect said cash housed in said first housing portion and authority to collect said cash housed in said second housing portion.

6. The store cash depositing and dispensing apparatus according to claim 1 further comprising:
an external control apparatus enabling control from outside.

7. A store cash depositing and dispensing apparatus comprising:
a depositing section for depositing an amount of cash;
a sector designation section for designating a sector defining whether or not it will be possible to perform withdrawal of said amount deposited by said depositing section after depositing;
a first management section for managing amount data relating to said amount deposited by said depositing section based on said sector designated by said sector designation section;
a first housing portion for housing said cash deposited by said depositing section so as to be withdrawable by a depositing operator;
a withdrawal section for withdrawing an amount of said cash housed in said first housing portion based on a predetermined withdrawal instruction;
a second management section for managing amount data relating to said amount withdrawn by said withdrawal section;
a second housing portion for housing cash so as not to be withdrawable by said depositing operator; and
a conveyance section for conveying at least a portion of said cash housed in said first housing portion to said second housing portion based on a predetermined conveyance instruction;
wherein:
said conveyance section comprises a selection section for selecting constituent denominations in such a way that said cash conveyed to and housed in said second housing portion based on said predetermined conveyance instruction is composed of a minimal number of constituent bills or notes.

8. A store cash depositing and dispensing apparatus comprising:
a depositing section for depositing an amount of cash;
a sector designation section for designating a sector defining whether or not it will be possible to perform withdrawal of said amount deposited by said depositing section after depositing;
a first management section for managing amount data relating to said amount deposited by said depositing section based on said sector designated by said sector designation section; a first housing portion for housing said cash deposited by said depositing section so as to be withdrawable by a depositing operator:
a withdrawal section for withdrawing an amount of said cash housed in said first housing portion based on a predetermined withdrawal instruction:
a second management section for managing amount data relating to said amount withdrawn by said withdrawal section:
a second housing portion for housing cash so as not to be withdrawable by said depositing operator: and
a conveyance section for conveying at least a portion of said cash housed in said first housing portion to said second housing portion based on a predetermined conveyance instruction;
wherein:
said predetermined conveyance instruction includes an instruction relating to an amount to be conveyed by said conveyance section, said amount to be conveyed according to said predetermined conveyance instruction being set based on amount data based on said sector designated as being not withdrawable managed by said first management section or set based on amount data determined by an input operation.

9. A store cash depositing and dispensing system comprising:
a center computer being a computer at a center for performing cash collection and delivery services; and
a store cash depositing and dispensing apparatus being disposed in a store and being connected to said center computer by means of a communication line, said store cash depositing and dispensing apparatus comprising:
a depositing section for depositing an amount of cash;
a sector designation section for designating a sector defining whether or not it will be possible to perform withdrawal of said amount deposited by said depositing section after depositing;
a first management section for managing amount data relating to said amount deposited by said depositing section based on said sector designated by said sector designation section;
a first housing portion for housing all of said cash deposited by said depositing section so as to be withdrawable by a depositing operator;
a withdrawal section for withdrawing an amount of said cash housed in said first housing portion based on a predetermined withdrawal instruction;
a second management section for managing amount data relating to said amount withdrawn by said withdrawal section;
a second housing portion for housing cash so as not to be withdrawable by said depositing operator; and a conveyance section for conveying at least a portion of said cash housed in said first housing portion to said second housing portion only upon receipt of a predetermined conveyance instruction.

10. A store cash depositing and dispensing management method in which cash is managed by a store cash depositing and dispensing apparatus disposed in a store, said store cash depositing and dispensing management method comprising:

housing an amount of cash after designating a sector defining whether or not it will be possible to perform withdrawal after depositing said cash and depositing all of said cash in a first housing portion in which said cash is withdrawable by a depositing operator;

managing amount data relating to said deposited amount based on said designated sector;

managing amount data relating to an amount of cash withdrawn when withdrawing cash housed in said first housing portion based on a withdrawal instruction; and conveying at least a portion of said cash housed in said first housing portion to a second housing portion in which said cash is not withdrawable by said depositing operator and housing said cash in said second housing portion only upon receipt of a predetermined conveyance instruction.

* * * * *

UNITED STATES PATENT AND TRADEMARK OFFICE
CERTIFICATE OF CORRECTION

PATENT NO. : 7,337,951 B2 Page 1 of 1
APPLICATION NO. : 10/083468
DATED : March 4, 2008
INVENTOR(S) : Katsuhiko Uchiyama et al.

It is certified that error appears in the above-identified patent and that said Letters Patent is hereby corrected as shown below:

Column 14, Line 16, change "operator:" to --operator;--.

Column 14, Line 19, change "instruction:" to --instruction;--.

Column 14, Line 22, change "section:" to --section;--.

Column 14, Line 24, change "operator:" to --operator;--.

Signed and Sealed this

Second Day of September, 2008

JON W. DUDAS
*Director of the United States Patent and Trademark Office*